(12) United States Patent
Agrawal et al.

(10) Patent No.: US 12,670,006 B2
(45) Date of Patent: Jun. 30, 2026

(54) DATA PROTECTION FOR SHORT-TERM AND LONG-TERM DATA

(71) Applicant: Rubrik, Inc., Palo Alto, CA (US)

(72) Inventors: Shivanshu Agrawal, Sunnyvale, CA (US); Rahul Das, Bangalore (IN); Dhananjay Mantri, Mountain View, CA (US); Archit Gupta, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 673 days.

(21) Appl. No.: 18/170,375

(22) Filed: Feb. 16, 2023

(65) Prior Publication Data

US 2024/0281271 A1 Aug. 22, 2024

(51) Int. Cl.
*G06F 9/455* (2018.01)
*H04L 9/40* (2022.01)
(52) U.S. Cl.
CPC ...... *G06F 9/45558* (2013.01); *H04L 63/1416* (2013.01); *H04L 63/1458* (2013.01); *G06F 2009/45587* (2013.01)
(58) Field of Classification Search
CPC ....... G06F 9/45558; G06F 2009/45587; H04L 63/1416; H04L 63/1458
See application file for complete search history.

(56) References Cited

U.S. PATENT DOCUMENTS

| | | | | |
|---|---|---|---|---|
| 2012/0254995 A1* | 10/2012 | Sallam | .................. | G06F 21/52 |
| | | | | 726/22 |
| 2015/0066859 A1* | 3/2015 | Blake | ................. | G06F 11/1438 |
| | | | | 707/649 |
| 2017/0004302 A1* | 1/2017 | Derbeko | ............ | G06F 9/45558 |
| 2019/0034633 A1* | 1/2019 | Seetharamaiah | ... | G06F 9/45558 |
| 2019/0109870 A1* | 4/2019 | Bedhapudi | .......... | H04L 63/0428 |
| 2020/0210075 A1* | 7/2020 | Jain | ....................... | G06F 3/0665 |
| 2020/0348955 A1* | 11/2020 | Meadowcroft | ..... | G06F 11/0712 |
| 2021/0218759 A1* | 7/2021 | Ahmed | ............... | H04L 63/0281 |
| 2023/0092808 A1* | 3/2023 | Hsiao | ...................... | G06F 21/53 |
| | | | | 718/1 |
| 2023/0254330 A1* | 8/2023 | Singh | .................... | G06F 11/323 |
| | | | | 726/23 |
| 2023/0275917 A1* | 8/2023 | Karmali | ............. | G06F 16/9537 |
| | | | | 709/224 |
| 2023/0319092 A1* | 10/2023 | Zeng | ................ | G06Q 10/06316 |
| | | | | 726/23 |
| 2024/0070034 A1* | 2/2024 | Bell | ....................... | G06N 20/00 |

* cited by examiner

*Primary Examiner* — Kenneth Tang
(74) *Attorney, Agent, or Firm* — Holland & Hart LLP

(57) ABSTRACT

Methods, systems, and devices for data management are described. The initiation or forthcoming initiation of a data protection operation for a computing system may be identified. Short-term information of the computing system, including information stored in the volatile memory of the computing system, network traffic associated with the computing system, or both, may be obtained based on the initiation or forthcoming initiation of the data protection operation. Long-term information of the computing system, including information stored in the non-volatile memory of the computing system, may be obtained based on the data protection operation being initiated. Both the short-term information and the long-term information may be stored for further analysis.

20 Claims, 8 Drawing Sheets

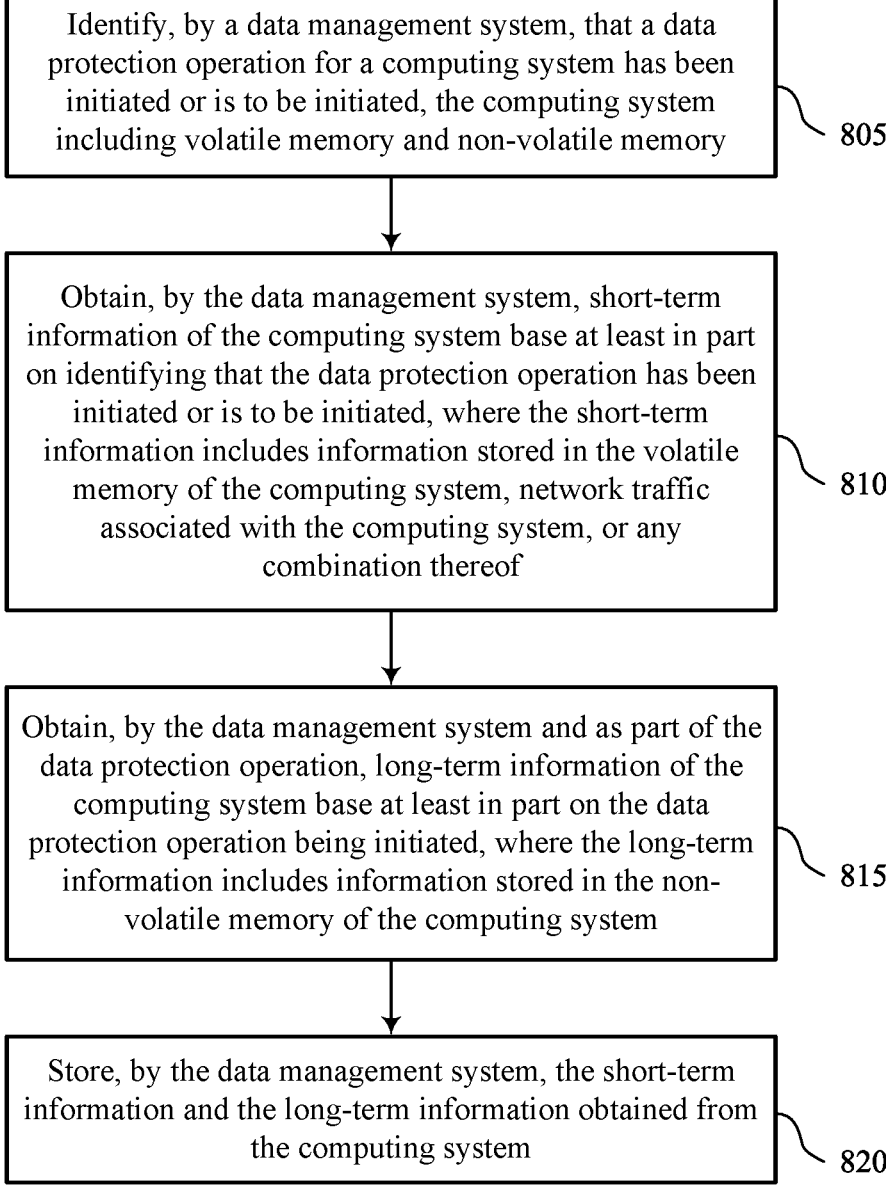

Identify, by a data management system, that a data protection operation for a computing system has been initiated or is to be initiated, the computing system including volatile memory and non-volatile memory

805

Obtain, by the data management system, short-term information of the computing system base at least in part on identifying that the data protection operation has been initiated or is to be initiated, where the short-term information includes information stored in the volatile memory of the computing system, network traffic associated with the computing system, or any combination thereof

810

Obtain, by the data management system and as part of the data protection operation, long-term information of the computing system base at least in part on the data protection operation being initiated, where the long-term information includes information stored in the non-volatile memory of the computing system

815

Store, by the data management system, the short-term information and the long-term information obtained from the computing system

DATA PROTECTION FOR SHORT-TERM AND LONG-TERM DATA

FIELD OF TECHNOLOGY

The present disclosure relates generally to data management, including techniques for data protection for short-term and long-term data.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIG. 8 illustrates a flowchart showing methods that support data protection for short-term and long-term data in accordance with aspects of the present disclosure.

DETAILED DESCRIPTION

A data management system (DMS) may protect long-term information (e.g., user data, system data, filesystem data, etc.) stored at one or more computing systems—e.g., by generating backups, snapshots, or both, for the one or more computing systems. Based on storing (e.g., in backup files and snapshot files) long-term information for a computing system, the DMS may be capable of analyzing the long-term information stored by the computing system for the presence of malware—e.g., by searching for filesystem footprints in the user data, system data, and/or filesystem data that is stored in the backup files, filesystem footprints in the filesystem data that is stored in the snapshots, or both. However, since the backup files and snapshot files stored by the DMS only store long-term information for a computing system, the malware detection services provided by the DMS may be unable to detect, in the computing system, short-term malicious activity (such as the execution of a malicious process in a volatile memory of the computing system, network activity to and from the computing system) that does not leave a filesystem footprint. Thus, techniques and configurations that enable the DMS to detect short-term malicious activity (e.g., malicious activity associated with so-called "fileless malware," as described further herein) for computing systems that have long-term data protected by the DMS may be desired.

To enable the DMS to detect short-term malicious activity, techniques and configurations for capturing short-term information (e.g., the content of a volatile memory, network activity) stored in or generated by a computing system concurrently with the capture of long-term information (e.g., by a backup operation, by a snapshot operation) stored in the computing system may be established.

Figure 1:
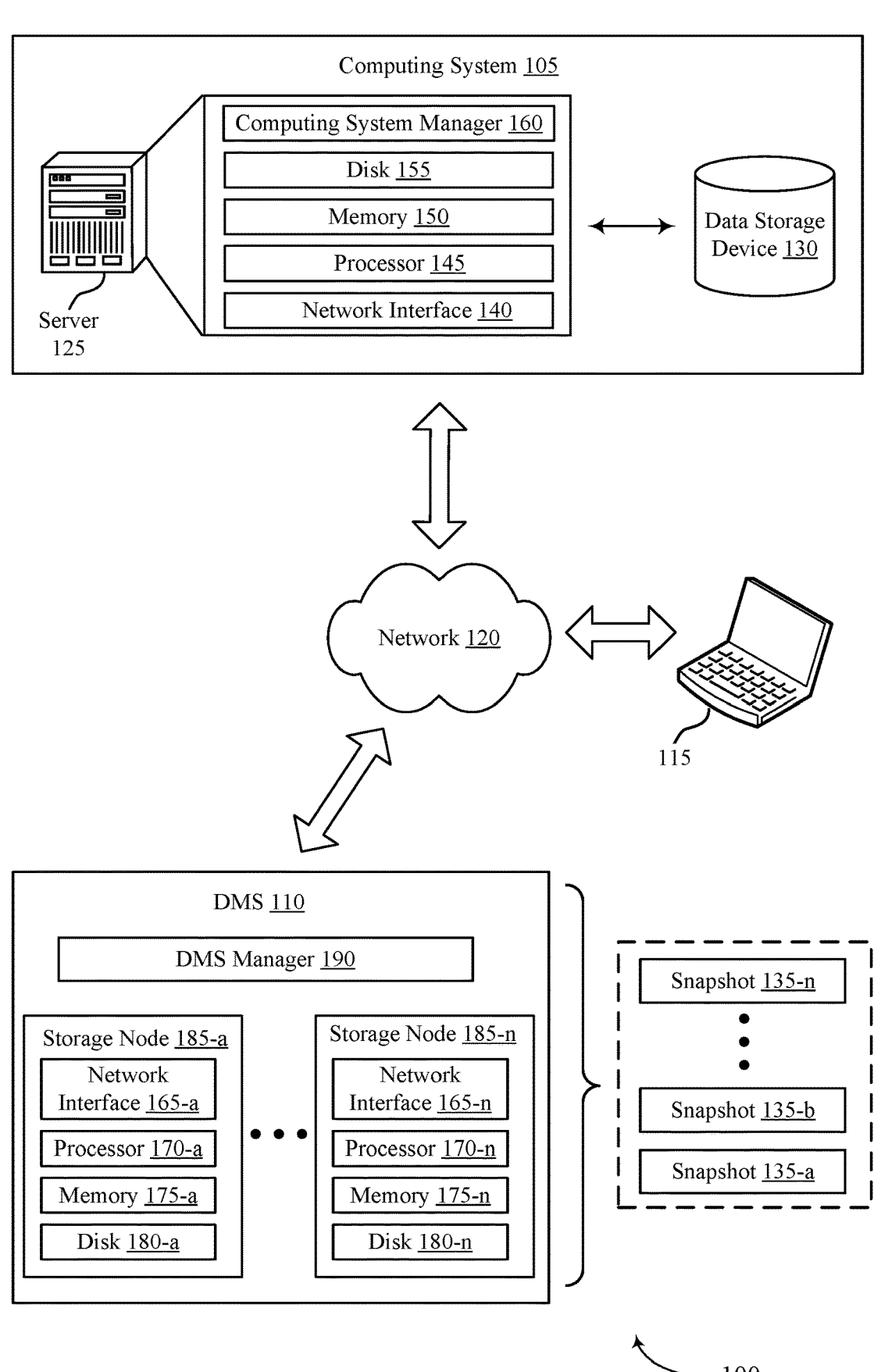
FIG. 1 illustrates an example of a computing environment that supports data protection for short-term and long-term data in accordance with aspects of the present disclosure.

FIG. 1 illustrates an example of a computing environment 100 that supports data protection for short-term and long-term data in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

To store user/system data (e.g., operating system files, driver files, data files, such as text files, audio files, video files, etc.), a computing system (e.g., the computing system 105, the server 125, a physical machine, a virtual machine, etc.) may be configured with a filesystem that controls how user data and metadata for the user data (e.g., filename, creation date, modification date, privileges, etc.) are stored in and retrieved from the computing system. The filesystem may also keep track of a file hierarchy that indicates an organization of the user/system data—e.g., in one or more folders. In some examples, file hierarchies and metadata are referred to as filesystem information.

A computing system may become infected with malware. In some examples, after a computing system is infected, signs of the infection may be found in the user/system data and/or filesystem information—e.g., based on hashes of user files, filenames, modification dates, etc. However, there is a class of malware (which may be referred to as "fileless malware") that does not create a filesystem footprint and, thus, cannot be detected by an analysis of user data and/or filesystem information. Instead, fileless malware may be detected based on an analysis of short-term information stored in or generated by the computing system—e.g., data stored in a volatile memory of an infected computing system, a network activity of an infected computing system. Some examples of fileless malware may be implemented as small, undetectable programs that are stored as a small, undetectable files in non-volatile memory and that fetch a malware payload directly into volatile memory while an infected computing system is in operating.

As described herein, the DMS 110 may be configured to protect user data and configurations for one or more computing systems by capturing data files stored by the one or more computing systems as well as respective filesystem information used to manage the storage of the data files at the one or more computing systems. The DMS 110 may be configured to create a backup file to store the user data and/or filesystem information captured from a computing system—e.g., in a compressed format and as part of a backup operation. Additionally, or alternatively, the DMS 110 may be configured to create a snapshot file to store filesystem information (e.g., without also storing the underlying system/user data) captured from the computing system. In some examples, a snapshot file may store some system/user data (e.g., system/user data that is deleted from the computing system) along with the filesystem information. Due to their data-efficient nature, snapshot files may be taken, and thus support the restoration, of a computing system to more frequent points in time than backup files (which are often larger and use more computing resources to generate than snapshot files).

Based on storing (e.g., in backup files and snapshot files) user/system data and filesystem information for a computing system, the DMS 110 may be capable of analyzing the stored user/system data and filesystem information for the presence of malware—e.g., by searching for filesystem footprints in the user/system data and/or filesystem information stored in the backup files, in the filesystem information stored in the snapshots, or both. For example, the DMS 110 may use yet another recursive algorithm (YARA) rules to match a user/system file or component of a user/system file—e.g., by matching textual definitions of text or binary patterns with indicators of compromise in a file or component of a file. However, since the backup files and snapshot files stored by the DMS 110 only store system/user data and filesystem data, the malware detection services provided by the DMS 110 may be unable to detect malicious activity (e.g., fileless malware) that does not leave a filesystem footprint. Thus, techniques and configurations that enable the DMS 110 to detect fileless malware may be desired.

To enable the DMS 110 to detect fileless malware, techniques and configurations for capturing short-term information (e.g., the content of a volatile memory, network activity) stored in or generated by a computing system concurrently with the capture of long-term information (e.g., by a backup operation, by a snapshot operation) stored by the computing system may be established.

In some examples, the DMS 110 identifies that a data protection operation (e.g., a backup operation, a snapshot operation, etc.) has been initiated or is to be initiated for the computing system 105. In some examples, the DMS 110 identifies that the data protection operation has been initiated based on a data protection job being pulled from a job queue, based on an execution of the data protection job being initiated, or both. Additionally, or alternatively, the DMS 110 identifies that the data protection operation is to be initiated based on a schedule for the data protection operation, based on the occurrence of an event that triggers the data protection operation, or both. Based on identifying that the data protection operation has been initiated, the DMS 110 may obtain short-term information of the computing system, where the short-term information may include information stored in the volatile memory of the computing system 105, network traffic associated with the computing system, or both. And based on the data protection operation being initiated, the DMS 110 may obtain long-term information of the computing system, where the long-term information may include information stored in the non-volatile memory of the computing system, such as filesystem data, user files, system files, metadata, etc. The DMS 110 may store the short-term information and the long-term information obtained from the computing system. In some examples, the short-term information and the long-term information stored by the DMS 110 may be analyzed (e.g., by the DMS 110 or an external device/actor)—e.g., to identify the presence of malware in the short-term information, the long-term information, or both.

By capturing short-term information associated with a computing system in conjunction with a backup operation, a system for regularly capturing short-term information associated with the computing system may be established. Also, by regularly capturing the short-term information associated with the computing system, malware activity that is otherwise undetectable based on analysis of long-term information of the computing system (e.g., fileless malware activity, unauthorized user activity, etc.) may be detected. Additionally, or alternatively, by regularly capturing the short-term information associated with the computing system, attacks on the computing system that are otherwise undetectable based on analysis of long-term information (e.g., network based attacks) may be detected.

Accordingly, by capturing short-term information associated with a computing system in conjunction with a backup operation, a DMS may provide for continuous and/or post-mortem monitoring of short-term information associated with the computing system while also protecting the long-term information of the computing system. In some examples, the DMS may use the analysis of the short-term information to identify a point-in-time when a malware infection of the computing system occurred—e.g., to identify long-term information stored for the computing system that is not tainted by the malware infection.

Figure 2:
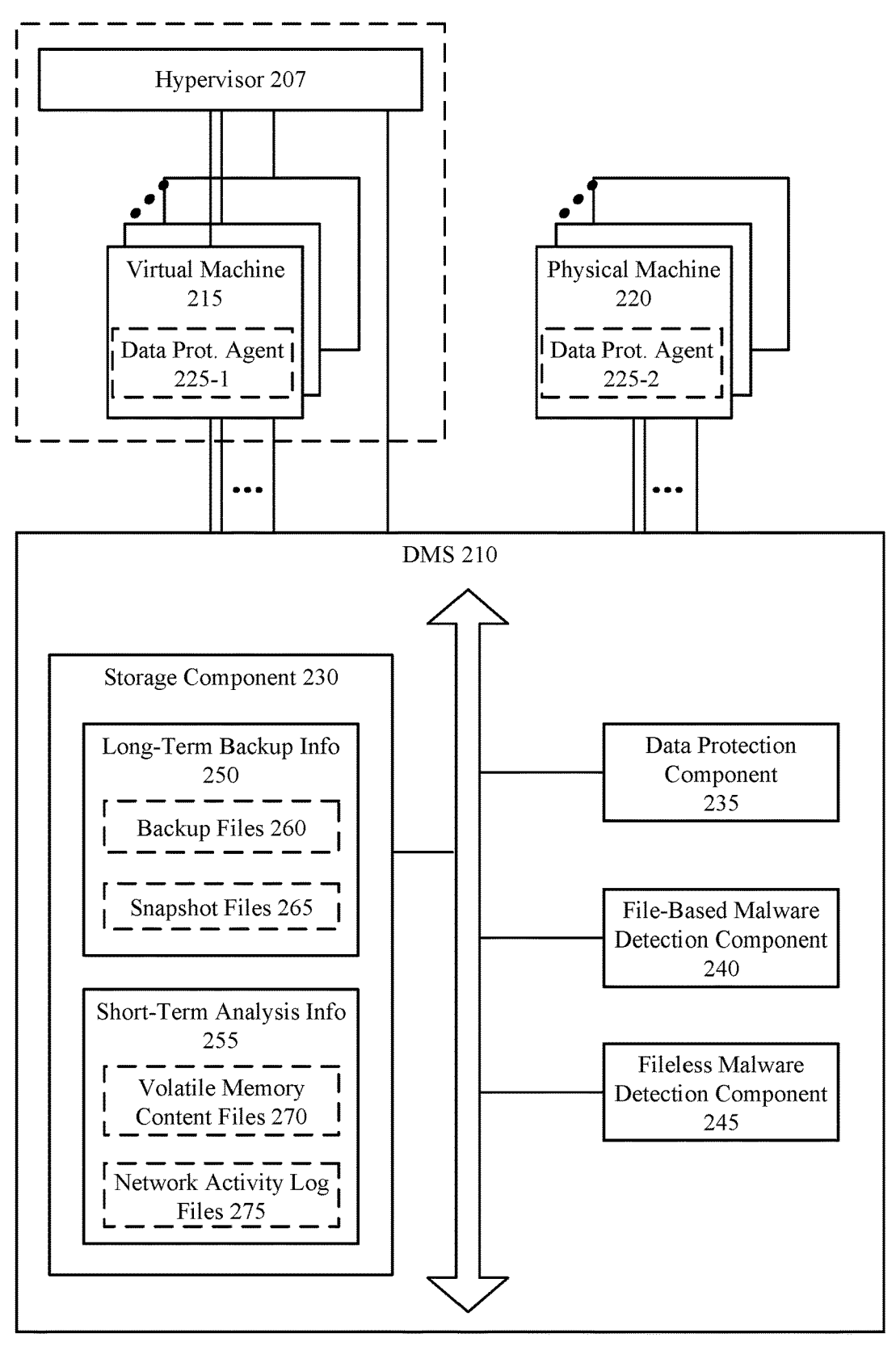
FIG. 2 illustrates an example of a subsystem that supports data protection for short-term and long-term data in accordance with aspects of the present disclosure.

FIG. 2 illustrates an example of a subsystem that supports data protection for short-term and long-term information in accordance with examples as disclosed herein.

The subsystem 200 may include the DMS 210, which may be an example of a DMS described herein (e.g., the DMS 110 of FIG. 1). The subsystem 200 may include one or more virtual machines (e.g., the virtual machine 215), where the operation of the virtual machines may be managed by the hypervisor 207. Additionally, or alternatively, the subsystem 200 may include one or more physical machines (e.g., the physical machine 220).

The DMS 210 may include the storage component 230, the data protection component 235, the file-based malware detection component 240, and the fileless malware detection component 245. In some examples, the storage component 230, the data protection component 235, the file-based malware detection component 240, and the fileless malware detection component 245 may be implemented across one or more storage nodes. The storage component 230 may be configured to store backup information for one or more computing systems. In some examples, the storage component 230 may be configured to store the long-term backup information 250 for one or more computing systems and short-term analysis information 255 for the one or more computing systems. The short-term analysis information 255 may include the volatile memory content files 270, the network activity log files 275, or both, for the one or more computing systems.

The long-term backup information 250 may include the backup files 260, the snapshot files 265, or both, for the one or more computing systems. The backup files 260 may store user data that was or is currently stored in the computing system along with filesystem information for the user data. The snapshot files 265 may store some user data for the computing system along with filesystem information for user data that was or is currently stored in the computing system. In both cases, the filesystem information may include file hierarchy information and metadata (e.g., file names, creation dates, modification dates, content type, authors, permissions, etc.) for the user data. As described herein, in some examples, the snapshot files 265 may store versions of the filesystem information that occur more frequently in time than the versions of the filesystem information stored in the backup files 260—e.g., the snapshot files 265 may store versions of a filesystem at fifteen minute intervals while the backup files 260 may store versions of the filesystem at daily intervals.

The data protection component 235 may be configured to obtain data (which may also be referred to as long-term information) that can be used to recover data lost by a computing system, restore a computing system to a particular point-in-time, or both. In some examples, the data protection component 235 may be configured to obtain, from one or more data protection agents running on one or more computing systems, backup files, snapshot files, or both, generated by the one or more data protection agents. The data protection component 235 may be further configured to obtain data (which may also be referred to as short-term information) that can be used to identify fileless malware running on a computing system. In some examples, the data protection component 235 may be configured to obtain the contents of one or more volatile memories of one or more computing systems, the network activity of one or more computing systems, or both. The data protection component 235 may be configured to receive short-term information from one or more data protection agents running on the one or more computing systems, a hypervisor, or both. In some examples, the data protection component 235 may coordinate with the storage component 230 to store the long-term and short-term information in the DMS 210.

The file-based malware detection component 240 may be configured to analyze the long-term backup information 250 to identify file-based malware—e.g., malware that leaves a footprint in a filesystem of a computing system. In some examples, the file-based malware detection component 240 is configured to apply YARA rules to the long-term backup information 250 to identify malware.

The fileless malware detection component 245 may be configured to analyze the short-term analysis information 255 to identify fileless malware—e.g., malware that leaves no footprint in a filesystem of a computing system. In some examples, the fileless malware detection component 245 is configured to analyze process trees derived from the volatile memory content files 270 to identify illegitimate processes, injected code, etc. Additionally, or alternatively, the fileless malware detection component 245 may be configured to analyze the network activity log files 275 for suspicious network activity (e.g., that is indicative of a DDoS attack). In some examples, the fileless malware detection component 245 is configured to apply SNORT rules to the network activity log files 275 for signature and network-based intrusion detection. In some examples, the fileless malware detection component 245 may be configured to analyze network activity log files taken for multiple computing systems—e.g., to identify attacks that are being coordinated across multiple computing systems in a computing environment.

In some examples, the fileless malware detection component 245 may be configured to analyze the short-term analysis information 255 to identify attacks on a computing system, coordinated attacks against a computing environment, or both. For example, the fileless malware detection component 245 may detect repeated and constant traffic from a same Internet Protocol (IP) address that is directed to a same port of a computing system. In another example, the fileless malware detection component 245 may detect repeated and constant traffic from a same Internet Protocol (IP) address that is directed to multiple computing systems in a computing environment.

In some examples, in addition or as an alternative to using the fileless malware detection component 245 to perform a malware detection analysis for the short-term analysis information 255, the DMS 210 may provide the information stored in the short-term analysis information 255 to a forensics analyst. In such cases, the forensics analyst may analyze the short-term analysis information 255 for footprints of fileless malware.

The virtual machine 215 may be an example of a virtual machine that is protected by the DMS 210. In some examples, the virtual machine 215 is a virtual computer, virtual phone, virtual server, or the like. The virtual machine 215 may be one of multiple virtual machines running in a physical environment, and an operation of the virtual machine 215 may be managed by the hypervisor 207. In some cases, the hypervisor 207 may manage the computing resources (e.g., non-volatile memory resources, volatile memory resources, network resources, etc.) that are allocated to the virtual machines, including the virtual machine 215. Accordingly, the hypervisor 207 may have access to the content stored in the volatile memory resources used by the virtual machines. In some examples, the hypervisor 207 may be configured to provide the content of the volatile memory of one or more of the virtual machines to the DMS 210— e.g., based on a data protection operation being performed for a respective virtual machine. In some examples, the DMS 210, a data protection agent, or both, requests that the hypervisor send the content of the volatile memory for the one or more virtual machines based on a data protection operation is performed for a respective virtual machine.

The first data protection agent 225-1 may be installed on the virtual machine 215. The first data protection agent 225-1 may be configured to generate data protection information (e.g., backup files, snapshot files, etc.) for the virtual machine 215—e.g., in accordance with a schedule, as triggered by an event, etc. The first data protection agent 225-1 may be further configured to send the data protection information to the DMS 210. In some examples, the first data protection agent 225-1 may be further configured to initiate the generation of a network activity log for the virtual machine 215 based on the data protection information being generated for the virtual machine 215. For example, based on determining that a data operation procedure has been initiated, a pre-data protection operation script may trigger the first data protection agent 225-1 to begin logging (e.g., by initiating a tcpdump tool) the network packets communicated with the virtual machine 215 for a duration (e.g., 30 seconds). The first data protection agent 225-1 may cache the network activity log at the virtual machine 215 until the network activity log is sent to the DMS 210. When the data protection operation completes, the first data protection agent 225-1 may be further configured to send both the data protection information and the network activity information to the DMS 210. In some examples, the first data protection agent 225-1 is configured to initiate the generation of network activity logs independent of data protection operations—e.g., on a more frequent basis than the initiation of the data protection operation.

The physical machine 220 may be an example of a physical machine that is protected by the DMS 210. The physical machine 220 may be one of multiple physical machines protected by the DMS 210. In some examples, the physical machine 220 is a laptop, desktop, phone, server, or the like. The physical machine 220 may include one or more non-volatile memories, one or more volatile memories, one or more network interfaces, and the like. The second data protection agent 225-2 may be installed on the physical machine 220. The second data protection agent 225-2 may be configured to generate data protection information (e.g., backup files, snapshot files, etc.) for the physical machine 220—e.g., in accordance with a schedule, as triggered by an event, etc. The second data protection agent 225-2 may be further configured to send the data protection information to the DMS 210. In some examples, the second data protection agent 225-2 may be configured to initiate the generation of a network activity log for the physical machine 220 as similarly described with reference to first data protection agent 225-1.

The second data protection agent 225-2 may also be configured to obtain the contents of the volatile memory of the physical machine 220 based on the data protection information being generated for the physical machine 220. For example, based on determining that a data operation procedure has been initiated, a pre-data protection operation script may trigger the second data protection agent 225-2 to inject a kernel (e.g., a Linux Memory Extractor (LiME) kernel) into the physical machine 220. The injected kernel may be configured to copy the contents of the volatile memory of the physical machine 220 to a known location on a disk of the physical machine 220. In some examples, the data protection operation may ignore (e.g., not backup) the location used by the kernel to store the volatile memory contents. When the data protection operation completes, the second data protection agent 225-2 may be further configured to send both the data protection information and the volatile memory content information to the DMS 210. The second data protection agent 225-2 may also delete the injected kernel from the physical machine 220 and delete the memory location used to store the volatile memory contents—e.g., as part of the execution of a post-data protection operation script.

Figure 3:
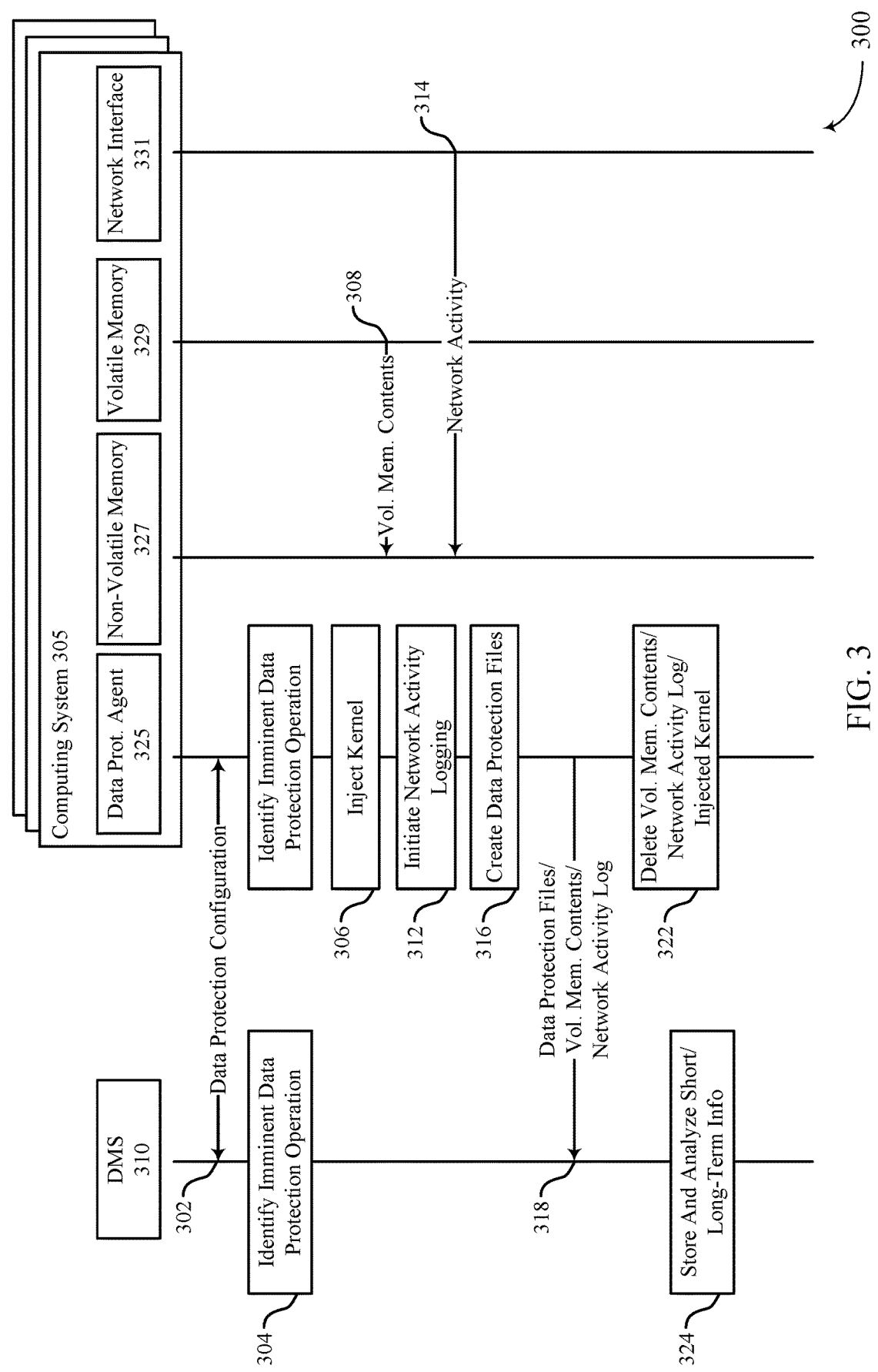
FIG. 3 illustrates an example of a set of operations for data protection for short-term and long-term data in accordance with aspects of the present disclosure.

FIG. 3 illustrates an example of a set of operations for data protection for short-term and long-term data in accordance with aspects of the present disclosure.

The process flow 300 may be performed by the DMS 310 and the computing system 305, which may be respective examples of a DMS (e.g., the DMS 110 of FIG. 1 or the DMS 210 of FIG. 2) and a computing system (e.g., the computing system 105 of FIG. 1, the virtual machine 215 of FIG. 2, the physical machine 220 of FIG. 2) described herein. In some examples, the process flow 300 shows an example set of operations performed to support data protection for short-term and long-term information. For example, the process flow 300 may include operations for capturing both short-term and long-term information for a computing system in synchronization with a data protection operation.

At 302, a data protection configuration may be configured (e.g., via a user interface of the DMS 310, via the data protection agent 325, or both) for the computing system 305. In some examples, the data protection configuration indicates a schedule for protecting long-term information stored at the computing system 305. The long-term information may include user data files, user program files, operating system files, driver files, filesystem information, metadata, etc. In some examples, the data protection configuration schedules a data protection operation that takes an image of the computing system 305. Additionally, or alternatively, the data protection configuration may schedule a data protection operation that creates a folder-level backup for data stored at one or more (e.g., all) locations in the computing system 305. Additionally, or alternatively, the data protection configuration may schedule a data protection operation that captures a state of a file system (which may be referred to as a snapshot) of the computing system 305.

In some example, the data protection configuration may indicate a schedule for backing up the data stored at the computing system 305—e.g., once a day. The data protection configuration may also indicate a schedule for taking snapshots of filesystem information stored at the computing system 305—e.g., every fifteen minutes. Additionally, or alternatively, the data protection configuration may indicate events that trigger a data protection operation. For example, the data protection configuration may indicate that a backup operation is to be performed whenever system-level data (e.g., operating system files, driver configurations, etc.) are changed. The data protection configuration may also indicate a schedule for deleting data protection data stored for the computing system 305.

In some examples, the data protection configuration may also include an indication that short-term information temporarily stored at or being generated by the computing system 305 is to be captured. The short-term information may include the contents of a volatile memory of the computing system, network activity of the computing system 305, and the like.

At 304, an imminent data protection operation for the computing system 305 may be identified—e.g., by the DMS 310, the data protection agent 325, or both. For example, it may be determined that a data protection operation for the computing system 305 has been initiated. Or it may be determined that a data protection operation for the computing system 305 is scheduled to be initiated within a threshold duration (e.g., within a minute, within ten minutes, etc.). The data protection operation may be a backup operation, a snapshot operation, or the like.

At 306, based on an imminent data protection operation being identified, a kernel may be injected (e.g., by the data protection agent 325) into a system kernel (e.g., the operating system kernel) of the computing system 305. The injected kernel (e.g., a LiME kernel) may have access to the volatile memory 329 of the computing system 305. The injected kernel may be further configured to copy the contents of the volatile memory 329 to a location in the non-volatile memory 327 of the computing system 305. The kernel may be injected into the system kernel before the data protection operation is performed, while the data protection operation is performed, after the data protection operation is performed, or any combination thereof.

In some examples, the kernel is injected into the system kernel as a result of a pre-data protection operation script that is run by the data protection agent 325. That is, after initiating the data protection operation but before executing the data protection operation, the data protection agent 325 may inject the kernel into the system kernel. Additionally, or alternatively, the kernel may be injected into the system kernel as a result of a post-data protection operation script that is run by the data protection agent 325 after the data protection operation is executed. Additionally, or alternatively, the kernel is injected (one or more times) into the system kernel while the data protection operation is in progress. In some examples, the injected kernel may be deleted each time after copying respective volatile memory contents. In other examples, the injected kernel may be maintained in the system kernel until the volatile memory contents are copied for the last time.

At 308, the contents of the volatile memory 329 may be copied (e.g., by the injected kernel) to a location in the non-volatile memory 327. In some examples, the location is excluded from the data protection operation—that is, the data protection operation may not capture the information stored at the location.

At 312, a network activity logging service may be initiated (e.g., by the data protection agent 325). In some examples, the data protection agent 325 is configured to perform both the kernel injection and the network activity logging. In other examples, the data protection agent 325 is configured to perform the network activity logging but not the kernel injection, or vice versa. The network activity logging service may monitor network traffic on one or more ports of the network interface 331 of the computing system 305. The network activity logging service may further record each incoming and outgoing message that is sent over the one or more ports in a network activity log. In some examples, the network activity logging service is configured to log the network activity for a duration (e.g., 30 seconds, a minute, etc.). The network activity may be logged before the data protection operation is performed, while the data protection operation is performed, after the data protection operation is performed, or any combination thereof.

In some examples, the network activity is logged as a result of a pre-data protection operation script that is run by the data protection agent 325. That is, after initiating the data protection operation but before executing the data protection operation, the data protection agent 325 may log the network activity of the computing system 305. Additionally, or alternatively, the network activity is logged as a result of a post-data protection operation script that is run by the data protection agent 325 after the data protection operation is executed. Additionally, or alternatively, the network activity is logged (one or more times) while the data protection operation is in progress. In some examples, data protection agent 325 may log the network activity of the computing system 305 independently of the backup operation—e.g., in accordance with a scheduled interval.

At 314, the network activity of the computing system 305 may be written to a network activity log at a location in the non-volatile memory 327. In some examples, the location is excluded from the data protection operation—that is, the data protection operation may not capture the information stored at the location.

At 316, data protection files may be created (e.g., by the data protection agent 325) for the computing system 305 in accordance with the data protection operation. In some examples, backup files for long-term information (e.g., user data, system data, filesystem data) at the computing system 305 may be created based on the data protection operation being executed. Additionally, or alternatively, snapshot files may be created for long-term information (e.g., primarily filesystem data) at the computing system 305 based on the data protection operation being executed. The long-term information may be stored in the non-volatile memory 327 of the computing system 305. The data protection operation may be executed for data stored at one or more (e.g., all) of the locations in the non-volatile memory 327. In some examples, the data protection agent 325 caches the data protection files in the non-volatile memory 327, the volatile memory 329, or both, before sending the data protection files to the DMS 310. In some examples, the volatile memory contents, the network activity log, and the data protection files may be generated and stored (e.g., in the non-volatile memory 327, the volatile memory 329, or both) separately from one another.

At 318, the data protection files, the volatile memory contents, and the network activity log for the computing system 305 may be sent (e.g., via the data protection agent 325) to the DMS 310. In some examples, the data protection files, the volatile memory contents, and the network activity log may be sent in separate messages to the DMS 310—e.g., the data protection files may be sent to the DMS 310, then the volatile memory contents, and then the network activity log.

At 322, the volatile memory contents, the network activity log, the injected kernel, or any combination thereof, may be deleted (e.g., by the data protection agent 325) from the computing system 305. In some examples, deleting the volatile memory contents, the network activity log, the injected kernel, or any combination thereof, may include deleting the locations used to store this information. As described herein, in some examples, the injected kernel is deleted after the volatile memory contents are obtained from the volatile memory 329—e.g., instead of being deleted after the volatile memory contents are sent to the DMS 310.

At 324, the short-term and long-term information received from the computing system 305 may be analyzed (e.g., by the DMS 310). For example, the DMS 310 may apply threat hunting procedures to the long-term information stored in the data protection files—e.g., to identify anomalous indicators. The DMS 310 may also apply malware identification procedures to the long-term information stored in the data protection files—e.g., to identify malware-suspected files.

In some examples, the DMS 310 may also analyze the short-term information stored in the volatile memory contents. For instance, the DMS 310 may analyze a process tree from the volatile memory contents to identify legitimate processes and illegitimate processes initiated by malware. The DMS 310 may also apply a program for identifying process that contain injected malware code—e.g., with a certain confidence level. Additionally, or alternatively, the DMS 310 may inspect the network activity logs for suspicious behavior. For example, the DMS 310 may search the network activity logs for repeated and constant messages (e.g., that are indicative of a DDoS attack). In some cases, the messages indicate that the computing system 305 is a participant in a DDoS attack, and thus compromised by malware. In other cases, the messages may indicate that the computing system 305 is being subjected to a DDoS attack. In such cases, the DMS 310 may identify one or more ports of the computing system 305 that are being attacked and may recommend ports for the computing system 305 to use. In some examples, the DMS 310 may apply SNORT rules to the network activity logs to search for user-defined traffic (which may be indicative of malware activity). In some examples, rather than (or in addition to) analyzing the short-term information, the DMS 310 may make the short-term information available to a user (e.g., a forensics analyst) for independent inspection.

Although FIG. 3 is generally described in the context of capturing short-term information and long-term information from a single computing system (the computing system 305), the DMS 310 may similarly capture short-term and long-term information from multiple computing system (e.g., simultaneously). In some examples, the computing systems may be a part of a larger computing environment. In such cases, the DMS 310 may be configured to correlate short-term information analyzed across multiple of the computing systems. For example, the DMS 310 may identify that similar network messages are being repeatedly and constantly received at the multiple computing systems to determine that the computing environment is under a DDoS attack.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

Figure 4:
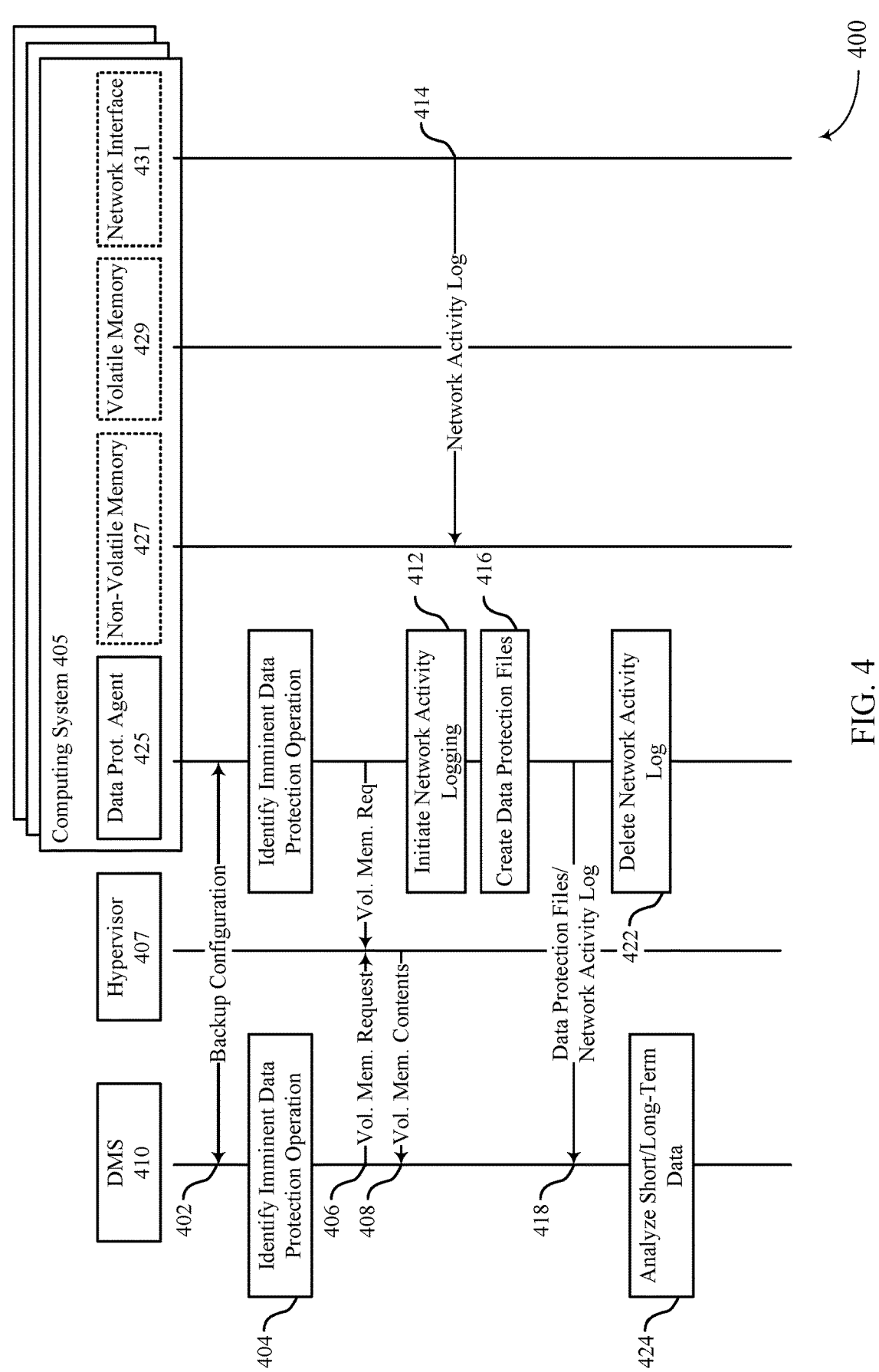
FIG. 4 illustrates an example of a set of operations for data protection for short-term and long-term data in accordance with aspects of the present disclosure.

FIG. 4 illustrates an example of a set of operations for data protection for short-term and long-term data in accordance with aspects of the present disclosure.

The process flow 400 may be performed by the DMS 410, the hypervisor 407, and the computing system 405, which may be respective examples of a DMS (e.g., the DMS 110 of FIG. 1, the DMS 210 of FIG. 2, the DMS 310 of FIG. 3), a hypervisor (e.g., the hypervisor 207 of FIG. 2), and a computing system (e.g., the computing system 105 of FIG. 1, the virtual machine 215 of FIG. 2) described herein. In some examples, the process flow 400 shows an example set of operations performed to support data protection for short-term and long-term information. For example, the process flow 400 may include operations for capturing both short-term and long-term information for a computing system in synchronization with a data protection operation.

At 402, a data protection configuration for the computing system 405 may be configured, as similarly described with reference to the operations described at 302. At 404, an imminent data protection operation for the computing system 405 may be identified, as similarly described with reference to the operations described at 304.

At 406, a request for the contents of the volatile memory 429 of the computing system 405 may be sent (e.g., by the DMS 410, the data protection agent 425, or both) to the hypervisor 407. As described herein, the hypervisor 407 may manage the computing resources allocated to the computing system 405, including the non-volatile memory resources, the volatile memory resources, and the network resources. Accordingly, the hypervisor 407 may have access to the volatile memory 429 of the computing system 405.

At 408, the contents of the volatile memory 429 may be sent (e.g., by the hypervisor 407) to the DMS 410. In some examples, the contents of the volatile memory 429 may instead be sent to the data protection agent 425, and the data protection agent 425 may store the contents of the volatile memory 429 at a specified location in the non-volatile memory 427 (e.g., as similarly described with reference to the operations described at 308).

At 412, a network activity logging service may be initiated to monitor the network interface 431, as similarly described with reference to the operations described at 312. At 414, the network activity of the computing system 405 may be written to a network activity log at a location in the non-volatile memory, as similarly described with reference to the operations described at 314. At 416, data protection files may be created for the computing system 405 in accordance with the data protection operation, as similarly described with reference to the operations described at 316. At 418, the data protection files, the network activity log (and, in some examples, the volatile memory contents) may be sent to the DMS 410, as similarly described with reference to the operations described at 318. At 422, the network activity log (and, in some examples, the volatile memory contents) may be deleted from the computing system 405, as similarly described with reference to the operations described at 322. At 424, the short-term and long-term information received from the computing system 305 may be analyzed, as similarly described with reference to the operations described at 324.

Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, when executed by a controller, may cause the controller to perform the operations of the process flow 400.

One or more of the operations described in the process flow 400 may be performed earlier or later, omitted, replaced, supplemented, or combined with another operation. Also, additional operations described herein may replace, supplement or be combined with one or more of the operations described in the process flow 400.

Figure 5:
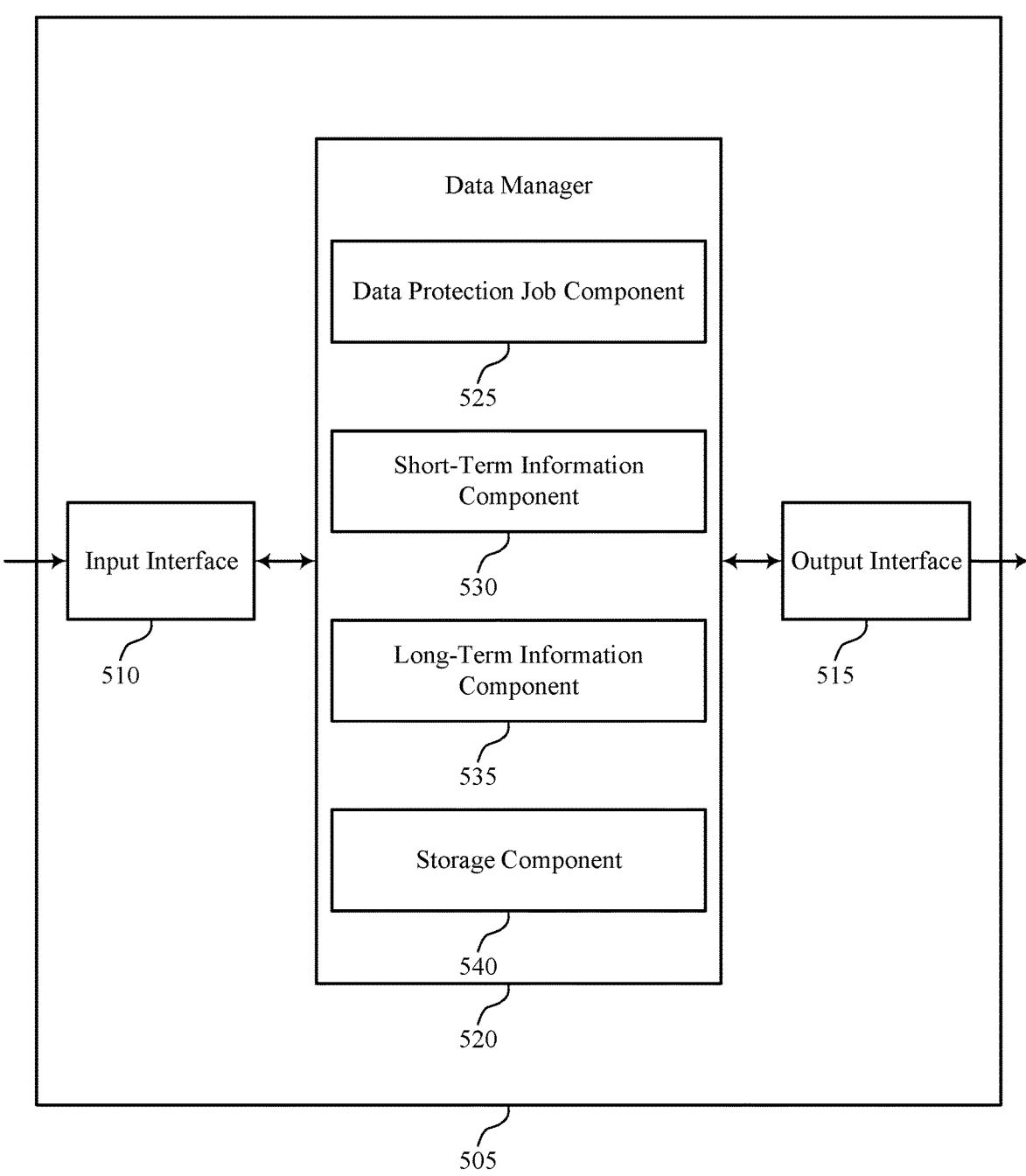
FIG. 5 illustrates a block diagram of an apparatus that supports data protection for short-term and long-term data in accordance with aspects of the present disclosure.

FIG. 5 illustrates a block diagram 500 of a system 505 that supports data protection for short-term and long-term data in accordance with aspects of the present disclosure. In some examples, the system 505 may be an example of aspects of one or more components described with reference to FIG. 1, such as a DMS 110. The system 505 may include an input interface 510, an output interface 515, and a data manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the data manager 520 to support data protection for short-term and long-term data. In some cases, the input interface 510 may be a component of a network interface 725 as described with reference to FIG. 7.

The output interface 515 may manage output signaling for the system 505. For example, the output interface 515 may receive signaling from other components of the system 505, such as the data manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the data manager 520 may include a data protection job component 525, a short-term information component 530, a long-term information component 535, a storage component 540, or any combination thereof. In some examples, the data manager 520, or various components thereof, may be configured to perform various operations (e.g., receiving, monitoring, transmitting) using or otherwise in cooperation with the input interface 510, the output interface 515, or both. For example, the data manager 520 may receive information from the input interface 510, send information to the output interface 515, or be integrated in combination with the input interface 510, the output interface 515, or both to receive information, transmit information, or perform various other operations as described herein.

The data protection job component 525 may be configured as or otherwise support a means for identifying, by a data management system, that a data protection operation for a computing system has been initiated or is to be initiated, the computing system including volatile memory and non-volatile memory. The short-term information component 530 may be configured as or otherwise support a means for obtaining, by the data management system, short-term information of the computing system based on identifying that the data protection operation has been initiated or is to be initiated, where the short-term information includes information stored in the volatile memory of the computing system, network traffic associated with the computing system, or any combination thereof. The long-term information component 535 may be configured as or otherwise support a means for obtaining, by the data management system and as part of the data protection operation, long-term information of the computing system based on the data protection operation being initiated, where the long-term information includes information stored in the non-volatile memory of the computing system. The storage component 540 may be configured as or otherwise support a means for storing, by the data management system, the short-term information and the long-term information obtained from the computing system.

Figure 6:
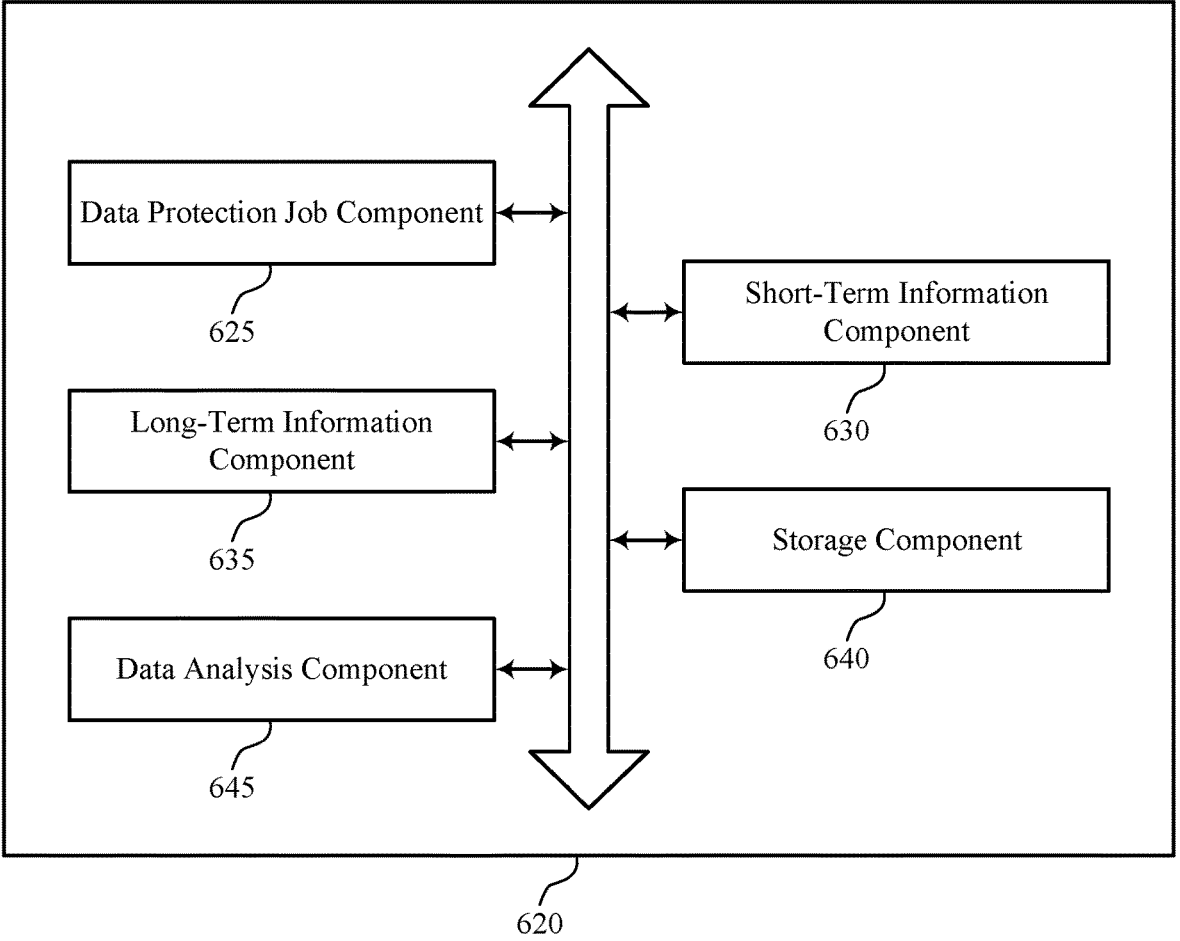
FIG. 6 illustrates a block diagram of a data manager that supports data protection for short-term and long-term data in accordance with aspects of the present disclosure.

FIG. 6 illustrates a block diagram 600 of a data manager 620 that supports data protection for short-term and long-term data in accordance with aspects of the present disclosure. The data manager 620 may be an example of aspects of a data manager or a data manager 520, or both, as described herein. The data manager 620, or various components thereof, may be an example of means for performing various aspects of data protection for short-term and long-term data as described herein. For example, the data manager 620 may include a data protection job component 625, a short-term information component 630, a long-term information component 635, a storage component 640, a data analysis component 645, or any combination thereof. Each of these components may communicate, directly or indirectly, with one another (e.g., via one or more buses, communications links, communications interfaces, or any combination thereof).

The data protection job component 625 may be configured as or otherwise support a means for identifying, by a data management system, that a data protection operation for a computing system has been initiated or is to be initiated, the computing system including volatile memory and non-volatile memory. The short-term information component 630 may be configured as or otherwise support a means for obtaining, by the data management system, short-term information of the computing system based on identifying that the data protection operation has been initiated or is to be initiated, where the short-term information includes information stored in the volatile memory of the computing system, network traffic associated with the computing system, or any combination thereof. The long-term information component 635 may be configured as or otherwise support a means for obtaining, by the data management system and as part of the data protection operation, long-term information of the computing system based on the data protection operation being initiated, where the long-term information includes information stored in the non-volatile memory of the computing system. The storage component 640 may be configured as or otherwise support a means for storing, by the data management system, the short-term information and the long-term information obtained from the computing system.

In some examples, the computing system includes a virtual machine implemented in a virtual environment that is managed by a hypervisor, and the short-term information component 630 may be configured as or otherwise support a means for requesting, from the hypervisor, the information stored in the volatile memory of the computing system based on identifying that the data protection operation has been initiated or is to be initiated, where the information stored in the volatile memory of the computing system is obtained by the data management system based on the requesting.

In some examples, the computing system includes a physical machine, and the short-term information component 630 may be configured as or otherwise support a means for introducing, by the agent, based on identifying that the data protection operation has been initiated or is to be initiated, a kernel into an operating system of the computing system, where the kernel is configured to access the volatile memory of the computing system and copy the information stored in the volatile memory of the computing system to a path in the non-volatile memory of the computing system.

In some examples, the kernel is further configured to copy, to the path, the information stored in the volatile memory of the computing system at multiple different times during execution of the data protection operation.

In some examples, the short-term information component 630 may be configured as or otherwise support a means for configuring, by the agent, the data protection operation to exclude the path in the non-volatile memory of the physical machine. In some examples, the data protection job component 625 may be configured as or otherwise support a means for initiating, by the agent, the data protection operation, where data stored at the path in the non-volatile memory of the computing system is excluded from the long-term information obtained by the data management system.

In some examples, the short-term information component 630 may be configured as or otherwise support a means for deleting, by the agent, the path in the non-volatile memory after the information stored in the volatile memory of the computing system is transferred to the data management system, after the data protection operation is completed, or both.

In some examples, the short-term information component 630 may be configured as or otherwise support a means for removing, by the agent, the kernel from the operating system after the short-term information is copied to the path in the non-volatile memory, after the short-term information is obtained by the data management system, after the data protection operation is completed, or any combination thereof.

In some examples, the computing system includes a physical machine or a virtual machine, and the short-term information component 630 may be configured as or otherwise support a means for initiating, by the agent, based on identifying that the data protection operation has been initiated or is to be initiated, a network application configured to generate logs of the network traffic associated with the computing system, where the network traffic associated the computing system is obtained by the data management system based on the agent initiating the network application.

In some examples, the network application is configured to write the logs to a path in the non-volatile memory of the computing system, and the data protection job component 625 may be configured as or otherwise support a means for initiating, by the agent, the data protection operation, where data stored at the path in the non-volatile memory of the computing system is excluded from the long-term information obtained by the data management system.

In some examples, the information stored in the volatile memory of the computing system is received in a first file, the network traffic associated with the computing system is received in a second file, and the information stored in the non-volatile memory of the computing system is received in a third file.

In some examples, the data analysis component 645 may be configured as or otherwise support a means for analyzing the short-term information for an indication of malicious activity.

In some examples, analyzing the short-term information for the malicious activity includes analyzing the information stored in the volatile memory of the computing system for one or more processes that are associated with a malware infection, analyzing the network traffic associated with the computing system for one or more network requests that are associated with a denial of service attack, or any combination thereof.

In some examples, the data management system is configured to protect a computing environment including a set of multiple computing systems that includes the computing system. In some examples, analyzing the short-term information for the malicious activity includes comparing the network traffic associated with the computing system with network traffic of one or more other computing systems of the set of multiple computing systems; and identifying, based on the comparing, coordinated network activity that indicates the malicious activity is distributed across the computing environment.

In some examples, the data management system is configured to protect a computing environment including a set of multiple computing systems that includes the computing system. In some examples, analyzing the short-term information for the malicious activity includes identifying, based on the network traffic associated with the computing system, one or more ports of the computing system being probed, attacked, or both, by an external actor; and generating an alert that the one or more ports of the computing system are being probed, attacked, or both.

In some examples, the data management system is configured to protect a computing environment including a set of multiple computing systems that includes the computing system. In some examples, analyzing the short-term information for the malicious activity includes identifying, based on the network traffic associated with the computing system, that multiple computing systems of the set of multiple computing systems are being probed, attacked, or both, by an external actor; and generating an alert that the computing environment is being probed, attacked, or both.

In some examples, a forthcoming initiation of the data protection operation is identified based on a schedule for executing the data protection operation, an occurrence of an event for triggering the data protection operation, or both.

In some examples, the long-term information includes system files, user files, metadata for system files, metadata for user files, filesystem information, or any combination thereof.

Figure 7:
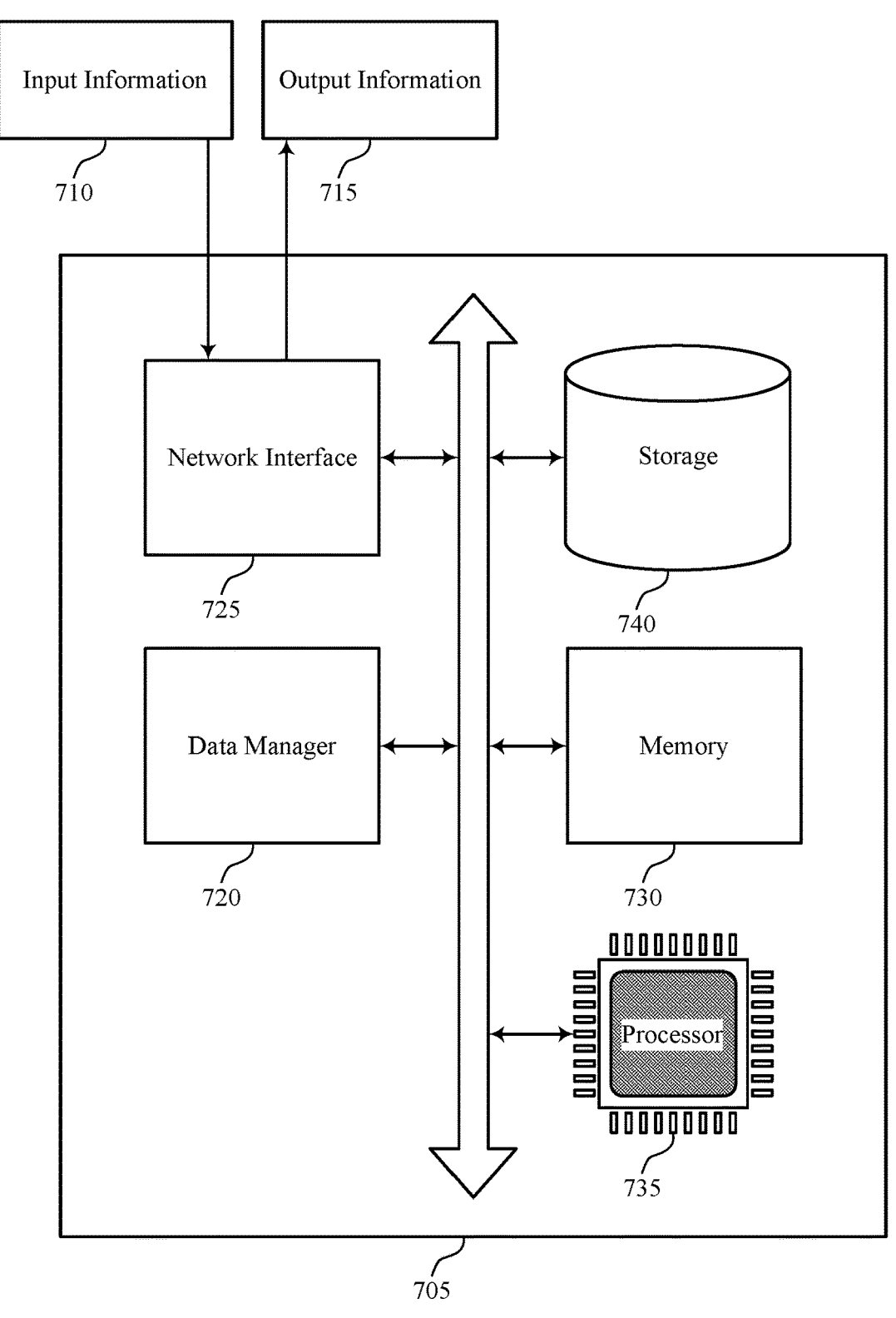
FIG. 7 illustrates a diagram of a system including a device that supports data protection for short-term and long-term data in accordance with aspects of the present disclosure.

FIG. 7 illustrates a block diagram 700 of a system 705 that supports data protection for short-term and long-term data in accordance with aspects of the present disclosure. The system 705 may be an example of or include the components of a system 505 as described herein. The system 705 may include components for data management, including components such as a data manager 720, an input information 710, an output information 715, a network interface 725, a memory 730, a processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting data protection for short-term and long-term data). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the data manager 720 may be configured as or otherwise support a means for identifying, by a data management system, that a data protection operation for a computing system has been initiated or is to be initiated, the computing system including volatile memory and non-volatile memory. The data manager 720 may be configured as or otherwise support a means for obtaining, by the data management system, short-term information of the computing system basing at least in part on identifying that the data protection operation has been initiated or is to be initiated, where the short-term information includes information stored in the volatile memory of the computing system, network traffic associated with the computing system, or any combination thereof. The data manager 720 may be configured as or otherwise support a means for obtaining, by the data management system and as part of the data protection operation, long-term information of the computing system basing at least in part on the data protection operation being initiated, where the long-term information includes information stored in the non-volatile memory of the computing system. The data manager 720 may be configured as or otherwise support a means for storing, by the data management system, the short-term information and the long-term information obtained from the computing system.

FIG. 8 illustrates a flowchart showing a method 800 that supports data protection for short-term and long-term data in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include identifying, by a data management system, that a data protection operation for a computing system has been initiated or is to be initiated, the computing system including volatile memory and non-volatile memory. The operations of 805 may be performed in accordance with examples as disclosed herein. In some examples, aspects of the operations of 805 may be performed by a data protection job component 625 as described with reference to FIG. 6.

At 810, the method may include obtaining, by the data management system, short-term information of the computing system based on identifying that the data protection operation has been initiated or is to be initiated, where the short-term information includes information stored in the volatile memory of the computing system, network traffic associated with the computing system, or any combination thereof. The operations of 810 may be performed in accordance with examples as disclosed herein. In some examples, aspects of the operations of 810 may be performed by a short-term information component 630 as described with reference to FIG. 6.

At 815, the method may include obtaining, by the data management system and as part of the data protection operation, long-term information of the computing system based on the data protection operation being initiated, where the long-term information includes information stored in the non-volatile memory of the computing system. The operations of 815 may be performed in accordance with examples as disclosed herein. In some examples, aspects of the operations of 815 may be performed by a long-term information component 635 as described with reference to FIG. 6.

At 820, the method may include storing, by the data management system, the short-term information and the long-term information obtained from the computing system. The operations of 820 may be performed in accordance with examples as disclosed herein. In some examples, aspects of the operations of 820 may be performed by a storage component 640 as described with reference to FIG. 6.

A method is described. The method may include identifying, by a data management system, that a data protection operation for a computing system has been initiated or is to be initiated, the computing system including volatile memory and non-volatile memory, obtaining, by the data management system, short-term information of the computing system based on identifying that the data protection operation has been initiated or is to be initiated, where the short-term information includes information stored in the volatile memory of the computing system, network traffic associated with the computing system, or any combination thereof, obtaining, by the data management system and as part of the data protection operation, long-term information of the computing system based on the data protection operation being initiated, where the long-term information includes information stored in the non-volatile memory of the computing system, and storing, by the data management system, the short-term information and the long-term information obtained from the computing system.

An apparatus is described. The apparatus may include a processor, memory coupled with the processor, and instructions stored in the memory. The instructions may be executable by the processor to cause the apparatus to identify, by a data management system, that a data protection operation for a computing system has been initiated or is to be initiated, the computing system including volatile memory and non-volatile memory, obtaining, by the data management system, short-term information of the computing system base at least in part on identifying that the data protection operation has been initiated or is to be initiated, where the short-term information includes information stored in the volatile memory of the computing system, network traffic associated with the computing system, or any combination thereof, obtaining, by the data management system and as part of the data protection operation, long-term information of the computing system base at least in part on the data protection operation being initiated, where the long-term information includes information stored in the non-volatile memory of the computing system, and store, by the data management system, the short-term information and the long-term information obtained from the computing system.

Another apparatus is described. The apparatus may include means for identifying, by a data management system, that a data protection operation for a computing system has been initiated or is to be initiated, the computing system including volatile memory and non-volatile memory, means for obtaining, by the data management system, short-term information of the computing system based on identifying that the data protection operation has been initiated or is to be initiated, where the short-term information includes information stored in the volatile memory of the computing system, network traffic associated with the computing system, or any combination thereof, means for obtaining, by the data management system and as part of the data protection operation, long-term information of the computing system based on the data protection operation being initiated, where the long-term information includes information stored in the non-volatile memory of the computing system, and means for storing, by the data management system, the short-term information and the long-term information obtained from the computing system.

A non-transitory computer-readable medium storing code is described. The code may include instructions executable by a processor to identify, by a data management system, that a data protection operation for a computing system has been initiated or is to be initiated, the computing system including volatile memory and non-volatile memory, obtaining, by the data management system, short-term information of the computing system base at least in part on identifying that the data protection operation has been initiated or is to be initiated, where the short-term information includes information stored in the volatile memory of the computing system, network traffic associated with the computing system, or any combination thereof, obtaining, by the data management system and as part of the data protection operation, long-term information of the computing system base at least in part on the data protection operation being initiated, where the long-term information includes information stored in the non-volatile memory of the computing system, and store, by the data management system, the short-term information and the long-term information obtained from the computing system.

In some examples of the method, apparatuses, and non-transitory computer-readable medium described herein, the computing system includes a virtual machine implemented in a virtual environment that may be managed by a hypervisor and the method, apparatuses, and non-transitory computer-readable medium may include further operations, features, means, or instructions for requesting, from the hypervisor, the information stored in the volatile memory of the computing system based on identifying that the data protection operation may have been initiated or may be to be initiated, where the information stored in the volatile memory of the computing system may be obtained by the data management system based on the requesting.

In some examples of the method, apparatuses, and non-transitory computer-readable medium described herein, the computing system includes a physical machine and the method, apparatuses, and non-transitory computer-readable medium may include further operations, features, means, or instructions for introducing, by the agent, based on identifying that the data protection operation may have been initiated or may be to be initiated, a kernel into an operating system of the computing system, where the kernel may be configured to access the volatile memory of the computing system and copy the information stored in the volatile memory of the computing system to a path in the non-volatile memory of the computing system.

In some examples of the method, apparatuses, and non-transitory computer-readable medium described herein, the kernel may be further configured to copy, to the path, the information stored in the volatile memory of the computing system at multiple different times during execution of the data protection operation.

In some examples of the method, apparatuses, and non-transitory computer-readable medium described herein, configuring, by the agent, the data protection operation to exclude the path in the non-volatile memory of the physical machine and initiating, by the agent, the data protection operation, where data stored at the path in the non-volatile memory of the computing system may be excluded from the long-term information obtained by the data management system.

Some examples of the method, apparatuses, and non-transitory computer-readable medium described herein may further include operations, features, means, or instructions for deleting, by the agent, the path in the non-volatile memory after the information stored in the volatile memory of the computing system may be transferred to the data management system, after the data protection operation may be completed, or both.

Some examples of the method, apparatuses, and non-transitory computer-readable medium described herein may further include operations, features, means, or instructions for removing, by the agent, the kernel from the operating system after the short-term information may be copied to the path in the non-volatile memory, after the short-term information may be obtained by the data management system, after the data protection operation may be completed, or any combination thereof.

In some examples of the method, apparatuses, and non-transitory computer-readable medium described herein, the computing system includes a physical machine or a virtual machine and the method, apparatuses, and non-transitory computer-readable medium may include further operations, features, means, or instructions for initiating, by the agent, based on identifying that the data protection operation may have been initiated or may be to be initiated, a network application configured to generate logs of the network traffic associated with the computing system, where the network traffic associated the computing system may be obtained by the data management system based on the agent initiating the network application.

In some examples of the method, apparatuses, and non-transitory computer-readable medium described herein, the network application may be configured to write the logs to a path in the non-volatile memory of the computing system and the method, apparatuses, and non-transitory computer-readable medium may include further operations, features, means, or instructions for initiating, by the agent, the data protection operation, where data stored at the path in the non-volatile memory of the computing system may be excluded from the long-term information obtained by the data management system.

In some examples of the method, apparatuses, and non-transitory computer-readable medium described herein, the information stored in the volatile memory of the computing system may be received in a first file, the network traffic associated with the computing system may be received in a second file, and the information stored in the non-volatile memory of the computing system may be received in a third file.

Some examples of the method, apparatuses, and non-transitory computer-readable medium described herein may further include operations, features, means, or instructions for analyzing the short-term information for an indication of malicious activity.

Some examples of the method, apparatuses, and non-transitory computer-readable medium described herein may further include operations, features, means, or instructions for analyzing the short-term information for the malicious activity includes analyzing the information stored in the volatile memory of the computing system for one or more processes that may be associated with a malware infection, analyzing the network traffic associated with the computing system for one or more network requests that may be associated with a denial of service attack, or any combination thereof.

In some examples of the method, apparatuses, and non-transitory computer-readable medium described herein, the data management system may be configured to protect a computing environment including a set of multiple computing systems that includes the computing system and analyzing the short-term information for the malicious activity includes comparing the network traffic associated with the computing system with network traffic of one or more other computing systems of the set of multiple computing systems; and identifying, based on the comparing, coordinated network activity that indicates the malicious activity may be distributed across the computing environment.

In some examples of the method, apparatuses, and non-transitory computer-readable medium described herein, the data management system may be configured to protect a computing environment including a set of multiple computing systems that includes the computing system and analyzing the short-term information for the malicious activity includes identifying, based on the network traffic associated with the computing system, one or more ports of the computing system being probed, attacked, or both, by an external actor; and generating an alert that the one or more ports of the computing system may be being probed, attacked, or both.

In some examples of the method, apparatuses, and non-transitory computer-readable medium described herein, the data management system may be configured to protect a computing environment including a set of multiple computing systems that includes the computing system and analyzing the short-term information for the malicious activity includes identifying, based on the network traffic associated with the computing system, that multiple computing systems of the set of multiple computing systems may be being probed, attacked, or both, by an external actor; and generating an alert that the computing environment may be being probed, attacked, or both.

In some examples of the method, apparatuses, and non-transitory computer-readable medium described herein, a forthcoming initiation of the data protection operation may be identified based on a schedule for executing the data protection operation, an occurrence of an event for triggering the data protection operation, or both.

In some examples of the method, apparatuses, and non-transitory computer-readable medium described herein, the long-term information includes system files, user files, metadata for system files, metadata for user files, filesystem information, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
identifying, by a data management system, that a data protection operation for a computing system has been initiated or is to be initiated, the computing system comprising volatile memory and non-volatile memory, wherein the data protection operation corresponds to backing up data stored at the computing system;
obtaining, by the data management system, short-term information of the computing system based at least in part on identifying that the data protection operation has been initiated or is to be initiated, wherein the short-term information comprises information stored in the volatile memory of the computing system, network traffic associated with the computing system, or any combination thereof, and wherein a copy of the short-term information is stored to one or more first locations in the non-volatile memory of the computing system, the one or more first locations excluded from the data protection operation;
obtaining, by the data management system and as part of the data protection operation, long-term information of the computing system based at least in part on the data protection operation being initiated, wherein the long-term information comprises information stored in one or more second locations of the non-volatile memory of the computing system, the one or more second locations of the non-volatile memory being different from the one or more first locations comprising the copy of the short-term information; and
storing, by the data management system, the short-term information and the long-term information obtained from the computing system.

2. The method of claim 1, wherein the computing system comprises a virtual machine implemented in a virtual environment that is managed by a hypervisor, the method further comprising:
requesting, from the hypervisor, the information stored in the volatile memory of the computing system based at least in part on identifying that the data protection operation has been initiated or is to be initiated,
wherein the information stored in the volatile memory of the computing system is obtained by the data management system based at least in part on the requesting.

3. The method of claim 1, wherein the computing system comprises a physical machine, wherein an agent of the data management system runs on the computing system, and wherein the method further comprises:
introducing, by the agent, based at least in part on identifying that the data protection operation has been initiated or is to be initiated, a kernel into an operating system of the computing system, wherein the kernel is configured to access the volatile memory of the computing system and copy the information stored in the volatile memory of the computing system to a path in the non-volatile memory of the computing system, the path comprising the one or more first locations.

4. The method of claim 3, wherein the kernel is further configured to copy, to the path, the information stored in the volatile memory of the computing system at multiple different times during execution of the data protection operation.

5. The method of claim 3, further comprising:
configuring, by the agent, the data protection operation to exclude the path in the non-volatile memory of the physical machine; and
initiating, by the agent, the data protection operation, wherein data stored at the path in the non-volatile memory of the computing system is excluded from the long-term information obtained by the data management system.

6. The method of claim 3, further comprising:
deleting, by the agent, the path in the non-volatile memory after the information stored in the volatile memory of the computing system is transferred to the data management system, after the data protection operation is completed, or both.

7. The method of claim 3, further comprising:
removing, by the agent, the kernel from the operating system after the short-term information is copied to the path in the non-volatile memory, after the short-term information is obtained by the data management system, after the data protection operation is completed, or any combination thereof.

8. The method of claim 1, wherein the computing system comprises a physical machine or a virtual machine, wherein an agent of the data management system runs on the computing system, and wherein the method further comprises:
initiating, by the agent, based at least in part on identifying that the data protection operation has been initiated or is to be initiated, a network application configured to generate logs of the network traffic associated with the computing system,
wherein the network traffic associated with the computing system is obtained by the data management system based at least in part on the agent initiating the network application.

9. The method of claim 8, wherein the network application is configured to write the logs to a path in the non-volatile memory of the computing system, the path comprising the one or more first locations, the method further comprising:

initiating, by the agent, the data protection operation, wherein data stored at the path in the non-volatile memory of the computing system is excluded from the long-term information obtained by the data management system.

10. The method of claim 1, wherein the information stored in the volatile memory of the computing system is received in a first file, the network traffic associated with the computing system is received in a second file, and the information stored in the non-volatile memory of the computing system is received in a third file.

11. The method of claim 1, further comprising:

analyzing the short-term information for an indication of malicious activity.

12. The method of claim 11, wherein analyzing the short-term information for the malicious activity comprises:

analyzing the information stored in the volatile memory of the computing system for one or more processes that are associated with a malware infection, analyzing the network traffic associated with the computing system for one or more network requests that are associated with a denial of service attack, or any combination thereof.

13. The method of claim 11, wherein the data management system is configured to protect a computing environment comprising a plurality of computing systems that includes the computing system, and wherein analyzing the short-term information for the malicious activity comprises:

comparing the network traffic associated with the computing system with network traffic of one or more other computing systems of the plurality of computing systems; and identifying, based at least in part on the comparing, coordinated network activity that indicates the malicious activity is distributed across the computing environment.

14. The method of claim 11, wherein the data management system is configured to protect a computing environment comprising a plurality of computing systems that includes the computing system, and wherein analyzing the short-term information for the malicious activity comprises:

identifying, based at least in part on the network traffic associated with the computing system, one or more ports of the computing system being probed, attacked, or both, by an external actor; and generating an alert that the one or more ports of the computing system are being probed, attacked, or both.

15. The method of claim 11, wherein the data management system is configured to protect a computing environment comprising a plurality of computing systems that includes the computing system, and wherein analyzing the short-term information for the malicious activity comprises:

identifying, based at least in part on the network traffic associated with the computing system, that multiple computing systems of the plurality of computing systems are being probed, attacked, or both, by an external actor; and generating an alert that the computing environment is being probed, attacked, or both.

16. The method of claim 1, wherein a forthcoming initiation of the data protection operation is identified based at least in part on a schedule for executing the data protection operation, an occurrence of an event for triggering the data protection operation, or both.

17. The method of claim 1, wherein the long-term information comprises system files, user files, metadata for system files, metadata for user files, filesystem information, or any combination thereof.

18. An apparatus, comprising:

one or more processors; and one or more memories coupled with the one or more processors, the one or more memories storing instructions executable by the one or more processors to cause the apparatus to:

identify, by a data management system, that a data protection operation for a computing system has been initiated or is to be initiated, the computing system comprising volatile memory and non-volatile memory, wherein the data protection operation corresponds to backing up data stored at the computing system;

obtain, by the data management system, short-term information of the computing system based at least in part on identifying that the data protection operation has been initiated or is to be initiated, wherein the short-term information comprises information stored in the volatile memory of the computing system, network traffic associated with the computing system, or any combination thereof, and wherein a copy of the short-term information is stored to one or more first locations in the non-volatile memory of the computing system, the one or more first locations excluded from the data protection operation;

obtain, by the data management system and as part of the data protection operation, long-term information of the computing system based at least in part on the data protection operation being initiated, wherein the long-term information comprises information stored in one or more second locations of the non-volatile memory of the computing system, the one or more second locations of the non-volatile memory being different from the one or more first locations comprising the copy of the short-term information; and store, by the data management system, the short-term information and the long-term information obtained from the computing system.

19. The apparatus of claim 18, wherein the computing system comprises a physical machine, wherein an agent of the data management system is configured to run on the computing system, and wherein the instructions are further executable by the one or more processors to cause the apparatus to:

introduce, by the agent, based at least in part on identifying that the data protection operation has been initiated or is to be initiated, a kernel into an operating system of the computing system, wherein the kernel is configured to access the volatile memory of the computing system and copy the information stored in the volatile memory of the computing system to a path in the non-volatile memory of the computing system, the path comprising the one or more first locations.

20. A non-transitory, computer-readable medium storing code comprising instructions executable by one or more processors to:

identify, by a data management system, that a data protection operation for a computing system has been initiated or is to be initiated, the computing system comprising volatile memory and non-volatile memory, wherein the data protection operation corresponds to backing up data stored at the computing system;

obtain, by the data management system, short-term information of the computing system based at least in part on identifying that the data protection operation has been initiated or is to be initiated, wherein the short-term information comprises information stored in the volatile memory of the computing system, network traffic associated with the computing system, or any combination thereof, and wherein a copy of the short-term information is stored to one or more first locations in the non-volatile memory of the computing system, the one or more first locations excluded from the data protection operation;

obtain, by the data management system and as part of the data protection operation, long-term information of the computing system based at least in part on the data protection operation being initiated, wherein the long-term information comprises information stored in one or more second locations of the non-volatile memory of the computing system, the one or more second locations of the non-volatile memory being different from the one or more first locations comprising the copy of the short-term information; and store, by the data management system, the short-term information and the long-term information obtained from the computing system.

* * * * *